United States Patent

[11] 3,620,890

[72] Inventor James W. Kemmler
 Needham, Mass.
[21] Appl. No. 710,146
[22] Filed Mar. 4, 1968
[45] Patented Nov. 16, 1971
[73] Assignee New London Mills, Inc.
 New London, Conn.

[54] FLOOR AND WALL COVERING AND METHOD OF MAKING SAME
 7 Claims, 6 Drawing Figs.

[52] U.S. Cl. .............................................. 161/6,
 117/64, 117/68, 156/79, 156/277, 156/278,
 161/82, 161/89, 161/97, 161/160, 161/413
[51] Int. Cl. ........................................ B32b 27/00,
 C09j 5/00, B44l 1/00
[50] Field of Search .......................................... 161/5-6,
 82-83, 88-89, 97, 160, 162, 413; 117/13, 24, 26,
 28, 29, 62, 64, 65.2, 68, 76 T; 156/78, 79,
 277-280

[56] References Cited
UNITED STATES PATENTS
3,518,153  6/1970  Slosberg et al. ............... 161/5

| | | | |
|---|---|---|---|
| 3,527,654 | 9/1970 | Jones et al. .................. | 117/76 X |
| 3,531,367 | 9/1970 | Karsten ....................... | 161/160 |
| 3,496,056 | 2/1970 | Steel et al. ................... | 161/83 |
| 3,499,956 | 3/1970 | Mountain ..................... | 161/5 X |
| 3,499,811 | 3/1970 | Clarke ......................... | 161/88 X |
| 3,501,370 | 3/1970 | Juredine ....................... | 161/160 |
| 3,519,527 | 7/1970 | Crowley ....................... | 161/160 X |
| 2,629,678 | 2/1953 | Thompson et al. ............. | 161/Vinyl |
| 2,980,575 | 4/1961 | Petry ........................... | 161/160 |
| 3,121,642 | 2/1964 | Biskup ......................... | 117/28 X |
| 3,360,422 | 12/1967 | Desch .......................... | 161/89 |
| 3,445,320 | 5/1969 | Boivin ......................... | 161/83 |

*Primary Examiner*—Harold Ansher
*Attorney*—Kane, Dalsimer, Kane, Sullivan and Kurucz ABSTRACT: A method for forming a decoratable, multilayer floor and wall covering comprising coating a fibrous reinforcing layer with a resilient backing, coating the opposite side of the fibrous layer with a gellable polymeric material, and gelling the polymeric material, against a smooth surface. The product formed by this process comprising layers of resilient backing, fibrous reinforcing, and gelled polymeric material, suitable for decoration.

PATENTED NOV 16 1971　3,620,890
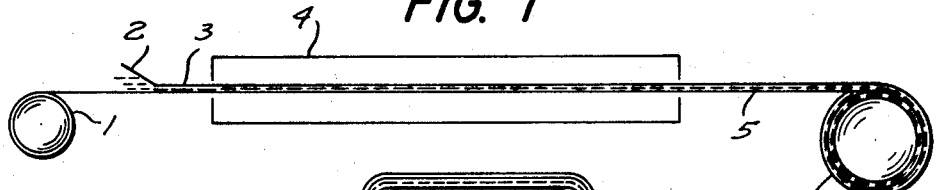
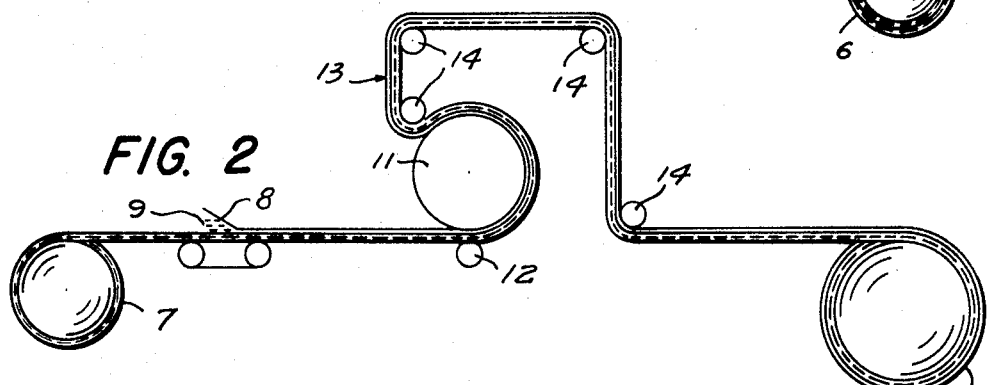
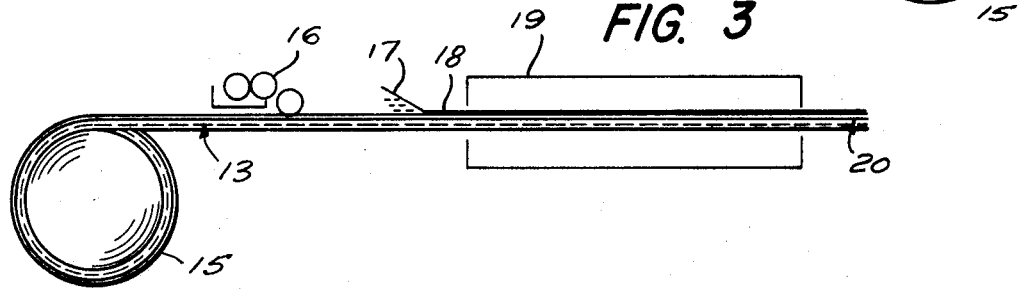
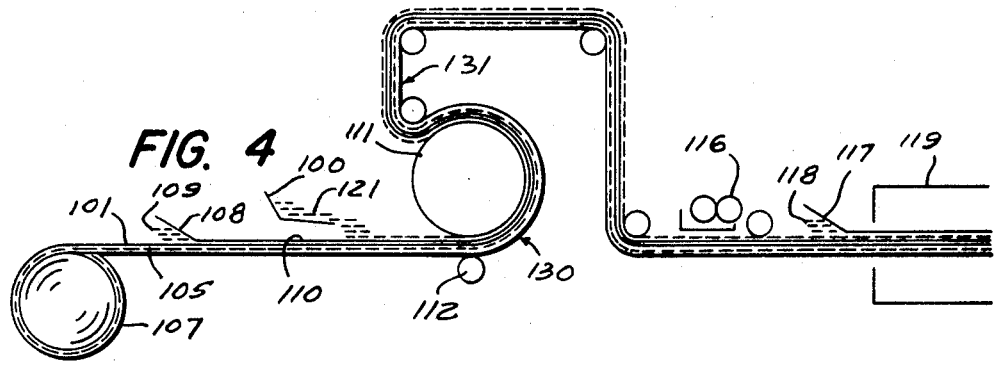
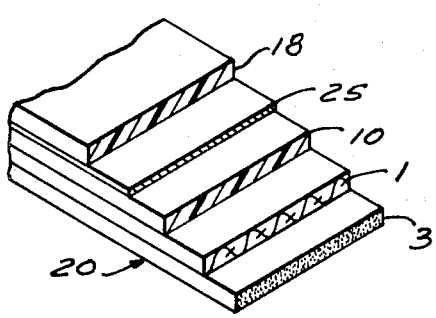
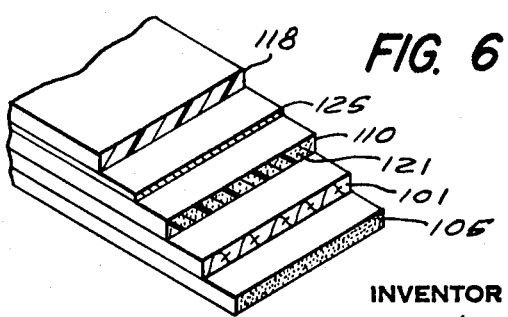
INVENTOR
JAMES W. KEMMLER
BY
Kane, Dalsimer, Kane, Sullivan + Smith
ATTORNEYS 3,620,890

FLOOR AND WALL COVERING AND METHOD OF MAKING SAME

BACKGROUND OF THE INVENTION

The prior art for forming resilient floor and wall coverings has described products comprising a resilient lower layer bonded to an intermediate fibrous layer which carries, on its surface, a decorated plastic layer. Many methods have been proposed for forming such structures, including laminating hot calendered sheets of the plastic onto the fibrous reinforcing, oven curing of a spread fluid composition, oven sintering and curing of a dry polymeric composition, and adhesively laminating sheets of the plastic to the fibrous reinforcing material.

Each of the prior art methods has suffered from certain deficiencies, not the least of which is the care which must be taken to assure that the decorative plastic layer is not damaged or deformed during the forming processes. Slight changes in conditions either cause a bubbling or wrinkling in the plastic layer, or cause a complete change in the design formed in the polymer. Further, by these prior art processes, separate curing steps are required for the resilient layer and for the polymeric layer.

SUMMARY OF THE INVENTION

In accordance with the present invention, we have found a method for forming a resiliently-backed floor and wall covering having a decorated upper surface, where complete curing of each of the layers of the covering is accomplished in a single operation.

A fibrous supporting base is coated with a resilient coating material, either one that has been previously frothed or one which will foam during heating. A material is thus formed which can be stored for further use. The resilient backing is bonded to the fibrous material by mechanical enmeshment and, thus, the strength of the bond is not susceptible to temperature fluctuations, nor, in general, to chemical separation.

The fibrous supporting material, coated with the resilient layer, is then coated in the reverse side with a gellable polymeric material and this material is gelled in contact with a smooth, heated surface, such as a polished, heated drum. The gelation converts the material from a liquid state where it is self-supporting and, again, the formed product can be stored for further use. Further, prior to gelling of the polymeric coating on the heated surface, decorative solid materials may be embedded in or coated on the coating. The smooth, heated surface provides, in addition, a surface on the gelled polymeric material which is essentially free of irregularities, and thus is particularly susceptible to decoration, as by printing.

The gelled coating, whether with or without solid decorative materials, can be used immediately, or can be taken from the storage roll, and printed with any desired design. The now finally decorated material is coated with a chemical- and abrasion-resistant, protective polymeric layer and is then run through an oven where the first polymeric layer, the design, if necessary, and the protective layer are cured, while the resilient layer, if necessary, is foamed. The protective polymeric layer is generally clear to allow viewing the design beneath it.

It it thus an object of the present invention to provide a method for forming resilient, decorative floor and wall coverings which are cured in a single step and which are susceptible to a variety of design methods, without the necessity for great care in protecting the decorative layer during further processing.

BRIEF DESCRIPTION OF THE DRAWINGS

In the accompanying drawings:

FIG. 1 is a diagrammatic side elevation of a machine for coating and the coating of a fibrous supporting layer with a resilient layer;

FIG. 2 is a diagrammatic side elevation of apparatus for coating and the coating of a fibrous supporting layer, having a resilient layer, with a polymeric layer and the gelling of that layer;

FIG. 3 is a diagrammatic side elevation showing the decorative printing and protective coating of the polymer layer and the curing of the formed covering product;

FIG. 4 is a diagrammatic side elevation, similar to FIG. 3, with the application of particulate design material;

FIG. 5 is a perspective view of a fragment of the product produced in FIG. 3, on a somewhat enlarged scale; and FIG. 6 is a perspective view of a fragment of the product produced according to FIG. 4, on a somewhat enlarged scale.

DESCRIPTION OF THE PREFERRED EMBODIMENTS

In accordance with the present invention a supporting base is used for the floor and wall covering to impart dimensional stability and to act as a carrier for the resilient and decorative layers of the present product. This base may be of a woven or nonwoven textile product. For example, the supporting layer may be a suitably bound flooring felt, such as one made on a paper machine with cellulose fibers. Additionally, a woven fabric such as cotton duck or burlap can be employed and, throughout this specification, the term "fabric" will be employed to describe both the felted and woven fibrous materials.

Referring to the figures, and particularly FIG. 1, a roll of fabric 1 is provided and is fed through an applicator 2 where a resilient backing 3 is applied. This resilient backing can be either of the frothed type, or one which foams under the action of heat. A frothed foam is one which is not dependent upon chemical decomposition during fusion, but rather air or gas is mixed into the polymeric composition before coating. Such a foam is stabilized with surfactants to retain the frothed condition during the fusing and curing of the other layers.

The foam coatings are of types described in the prior art. For example, the foamed coatings are generally formed form resins heated to about 300° to 400° F. for fusion. These resins are conveniently applied to the fabric carrier in the form of plastisols particularly when thermoplastic materials, such as polyvinylchloride, are employed. The materials and foaming agents are well known in the art and are described, for example, in the 1965 edition of Modern Plastics Encyclopedia in the article entitled "Foaming Agents," by H. R. Lasman, at pages 314 through 322.

Whether the resilient material employed is a frothed foam, or a foam coating which is produced with the application of heat, the final thickness should be from about one-sixteenth inch to about one-fourth inch, and preferably about one-eighth inch.

After coating of the resilient material 3 onto the fabric 1, the now coated fabric is run through an oven 4 at a temperature of from about 180° to 350° F., merely to set the polymers sufficiently for further processing. The coated fabric with the set polymeric coating 5 is wound up into roll 6 for further processing, or the coated fabric 5 can be directly processed further.

In FIG. 2 a roll of material 7, such as that produced at 6, is reversed and is run through a second resin applicator 8, where the printable, or decoratable, gellable polymeric surface material 9 is applied. This polymeric material 9 is a face surfacing coating and is preferably a polyvinylchloride plastisol. If desired, blowing agents, such as those employed in the resilient coating, can be incorporated in this plastisol to provide further resiliency. Additionally, fillers can be used in the composition. Such compositions, including useful plasticizers and fillers, are described, for example, IN U.S. Pat. NO. 2,558,378.

The fabric 5, with the resilient coating now on the bottom, and with the newly-applied face surfacing coating 10 is processed by a smooth, heated drum 11 with the application of a small amount of pressure from pressure roll 12. The temperature to which the coating 10 is raised by the drum 11 should be sufficient to only gel it, about 180° to 300° F. when employing a polyvinylchloride plastisol. The amount of pressure applied from the roll 12 is about 5 to 75 pounds per lineal inch of nip. The temperature if sufficient to set the polymeric surfacing coating to allow further processing, but does not completely cure it. From the heated drum 11, the fabric, with coatings set on each side, 13 is led over idler rolls 14 to allow for cooling and is then wound upon roll 15 for storage until further processing. As is the case with the coated fabric 5, the material 13 may be processed further, without storage.

Referring particularly to FIG. 3, the fabric 13 can now be decorated, as by printing it at 16. Any of the standard printing methods can be employed as, for example, rotogravure, flexogravure, or block printing means. The inks which are used are those compatible with the coating. These are known to the art and, for example, with a polyvinylchloride surfacing coating, the ink can have a formulation:

|  | Lbs. |
| --- | --- |
| Vinyl Chloride Copolymer Resin, having 12% Vinyl Acetate | 10 |
| Medium Hardness Acrylic Resin, Acryloid B—82 | 44 |
| 2-Nitropropane | 190 |
| Pigment | 20–30 |
| Cyclohexanone | 25 |

After printing, a protective polymeric material is applied at 17 to provide top layer 18 on the covering product. This protective polymeric material can be a vinyl solution, latex, organosol, or plastisol. Additionally, it can be a standard varnish, lacquer, or other resinous material, such as a polyurethane. The particular type and amount of protective coating used will vary depending upon the service to which the floor or wall covering is to be put. For example, with a heavy duty floor covering, the protective material would consist of a vinyl polymer composition with a thickness of about 0.005 inch to 0.015 inch. A typical formulation for such a composition is:

|  | Lbs. |
| --- | --- |
| Vinyl Polymer Dispersion |  |
| Resin, Marvinol VR-50 | 100 |
| Dioctyl Phthalate | 20 |
| Butyl Benzyl Phthalate | 10 |
| Epoxidized Soya Oil | 4 |
| Stabilizer | 2 |
| Mineral Spirits | 10 |

Following application of the top layer 18, the coated fabric is heated in oven 19 to cure each of the polymeric layers and to foam any of the layers which contain a foaming agent. The now completed floor or wall covering 20, as it leaves the oven, is cooled (by means not shown) and can be either rolled for shipment or storage, or cut to a desired size.

An alternative method of decorating a composition within the present invention is shown in FIG. 4. Here, a roll 107 of a supporting fabric 101 having a set coating of resilient material 105 is coated with a gellable polymeric material 109 employing applicator 108 to form a face surfacing coating 110, but is further processed before being treated on the smooth, heated drum 111. An applicator 100 dispenses particulate material 121 onto the still relatively fluid polymeric face surfacing coating 110. Generally, the dimensions of the particulate material are so controlled that they do not protrude from the surface of the coating 110. In this manner, when the material 130, coated with the resilient coating 105, the face surfacing coating 110, and the particulate material 121, is led around the heating drum 111, and through the pressure roller 112, the particulate material 121 will be surfaced into the face surfacing coating 110.

The particulate material 121 must have an adhesive compatibility with the coating 110. When a polyvinylchloride is employed as the coating 110, the particulate material 111 can be formed of, for example, polyvinylchloride, polyvinylacetate, copolymers of polyvinylchloride and polyvinylacetate, acrylonitrilebutadiene copolymers, acrylic polymers, etc. This particulate material can be colored in a variety of manners to provide the desired design in the finally formed product. After processing with the heated drum 111 and pressure roller 112, the coated material 131 is cooled and is then printed as at 116 and a clear coat 118 applied as at 117 in the same manner as with the decorative coating formed without particulate material. This material is led through an oven 119 to cure the various coatings and to foam the resilient backing, if necessary. Again, this final material can be rolled up for shipment or storage, or can be cut to appropriate lengths for the desired use.

In FIG. 5, the structure of the material 20 is shown in detail, including the bottom resilient layer 3, the supporting fabric 1, the face surfacing coating 10, the printed design 25 and the clear coat 18. In FIG. 6, a similar structure for the product formed with decorative particulate material mixed with the face surfacing coating is shown, having a resilient backing 105, a supporting fabric 101, a mixed resin 110 and particulate material 121 face surfacing coating, a printed design 125, and a clear coat 118.

In accordance with the present invention a method has been described for forming a resilient, decorative floor and wall covering in a minimum number of steps, and avoiding the problems of the prior art with respect to damaging of the decorative coating during processing. In accordance with the present invention, the material is not heated to the relatively high curing and foaming temperatures until each of the layers has been applied and, thus, not only is the danger of damaging the decorative coating avoided, but fewer processing steps are required. The primary step in this process is the gelling of the face surfacing coating, rather than its complete cure, prior to printing and application of the surface coat. Further, a product has been described where a supporting fabric is provided wit a resilient backing and, with a gelled surface coating layer which can be decorated in numerous ways.

The invention has been described in detail with particular reference made to various preferred embodiments thereof, but it will be understood that variations and modifications can be effected within the spirit and scope of the invention as described hereinabove and as defined in the appended claims.

I claim:

1. A method for forming a floor and wall covering comprising:
   a. providing a fabric supporting layer;
   b. coating one surface of said fabric supporting layer with a foamable, resilient backing;
   c. coating the opposite surface of said fabric supporting layer with a gellable, printable, polymeric surface coating layer; and
   d. gelling said polymeric surface coating layer against a smooth surface with the application of heat.

2. A method for forming a floor and wall covering comprising:
   a. providing a fabric supporting layer;
   b. coating one surface of said fabric supporting layer with a foamable, resilient backing;
   c. setting the resilient backing layer;
   d. coating the opposite surface of said fabric supporting layer with a gellable, printable, polymeric surface coating layer; and
   e. gelling said polymeric surface coating layer against a smooth surface with the application of heat.

3. The method of claim 2 wherein said polymeric surface layer is printed, a protective polymeric coating applied over the printing, and the clear polymeric coating, face surface coating, and printing cured, and the resilient backing layer foamed, the curing and foaming being carried out simultaneously.

4. The method of claim 2 wherein decorative particulate material is added to the polymeric surface layer prior to gelling.

5. The method of claim 4 wherein said polymeric surface layer is printed, a protective polymeric coating applied over the printing, and the clear polymeric coating, face surface coating, and printing cured, and the resilient backing layer foamed, the curing and foaming being carried out simultaneously.

6. A method for forming a floor and wall covering comprising:
 a. providing a fabric supporting layer;
 b. coating one surface of said fabric supporting layer with a resilient, foamable backing;
 c. coating the opposite surface of said fabric supporting layer with a polyvinylchloride coating layer; and
 d. gelling said polyvinylchloride coating layer against a smooth surface with the application of heat.

7. A product for floor and wall coverings comprising:
 a. a fabric supporting layer;
 b. a coating of foamed resilient material on one surface of said fabric supporting layer;
 c. a gelled, polymeric face surface coating, said coating having been gelled against a smooth surface with the application of heat, having impregnated therein a decorative particulate material;
 d. a decorative printing on the surface of said gelled, polymeric face surface coating; and
 e. a protective polymeric coating on said smooth gelled face surface coating, above said decorative printing.

* * * * *